Figure 1:
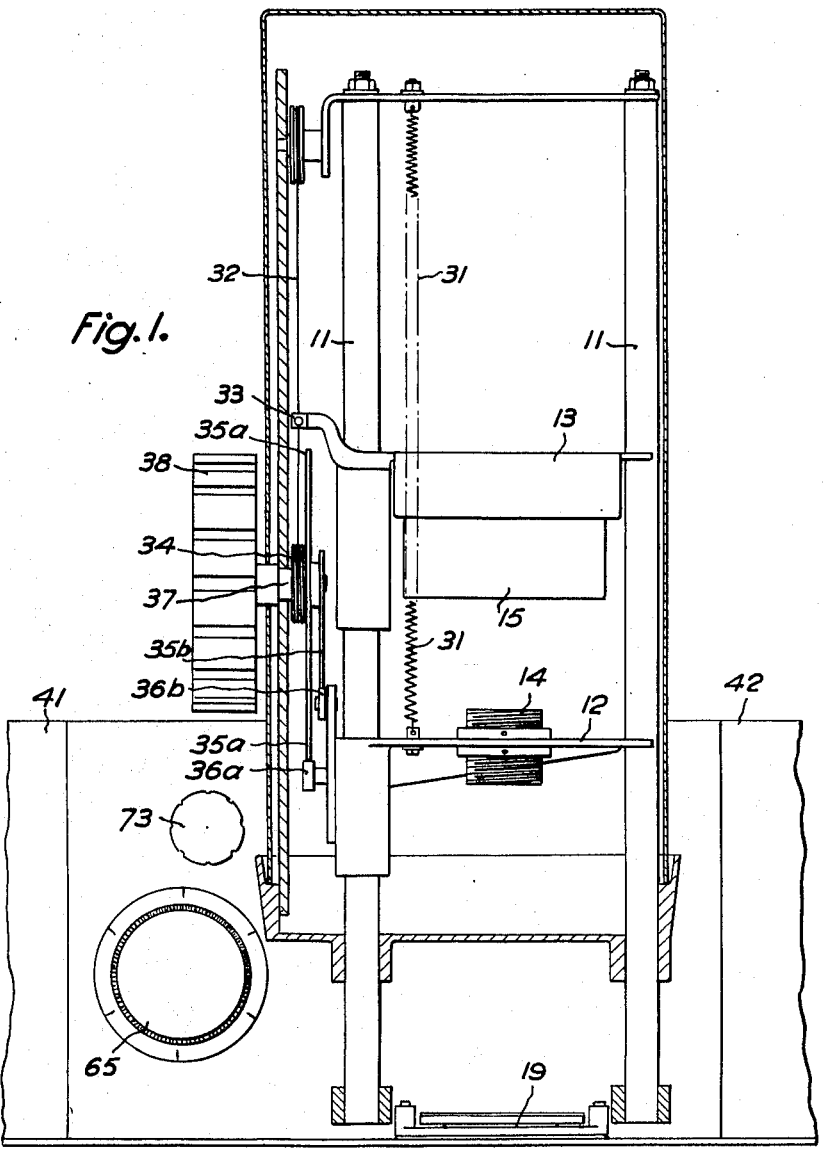

Nov. 2, 1965  E. C. WOODCOCK  3,215,034
FOCUSSING CAM STRUCTURE
Filed Jan. 29, 1963  2 Sheets-Sheet 1

Inventor
E. C. Woodcock
By
Watson, Cole, Grindle+Watson
Attys.

3,215,034
FOCUSSING CAM STRUCTURE
Edward Cecil Woodcock, Hawthorn Road, Willesden
Green, London, England
Filed Jan. 29, 1963, Ser. No. 254,811
Claims priority, application Great Britain, Jan. 30, 1962,
3,525/62
6 Claims. (Cl. 88—24)

This invention relates to photographic projection printing apparatus covering a range of magnification ratios with a single objective, equipped with cam controlled automatic focusing. If only magnification is to be provided for there is only one position of the objective for any particular optical distance between the negative and paper and it is then convenient to regulate the distance between the negative and paper by means coupled to a rotary cam which controls the position of the objective to keep the image in focus. Thus the distance can be controlled by a carriage which is moved from a rotary spindle, for example by a rack and pinion or by a flexible cable passing over a drum, the cam being mounted on the spindle. The carriage can move the paper while the negative remains stationary or it can move the negative while the paper remains stationary or it can move optical elements such as reflectors which vary the length of the optical path between the negative and paper while the negative and paper remain stationary.

If the optical distance between the negative and paper changes at a constant rate, corresponding to a constant rate of rotation of the spindle, the rate of movement of the objective to keep the image in focus is not constant or in other words the displacement of the objective for a given angular rotation of the spindle is not constant. It needs to be most rapid the lower the ratio of magnification.

If the parts are laid out so that the rate of movement of the objective is most rapid as the cam follower approaches the spindle the steepness which the cam surface makes with the radius for any given rate of displacement increases with reduction of the actual radius of the cam. Mechanical considerations impose a limit on steepness and accordingly if a single cam is provided to cover a substantial range its minimum radius must be comparatively large and the whole cam may become inconveniently large.

According to the present invention the cam is divided into two parts when the part which covers the range where the cam is steepest can have a suitable minimum radius and this part can cease when a comparatively short range has been covered whereupon the other cam part which is based on a smaller minimum radius takes over. The two cam parts may be side by side and the objective have two rollers co-acting with the respective cam parts. The two cam parts have a slight overlap so that the position of the objective carriage is constantly controlled. By way of example, for a magnification range from 1.15 to 1 up to 3.44 to 1, the first part of the cam may cover about 80° of the rotation of the cam shaft and the second part of the cam cover about 250°. The overlap need not be more than a few degrees say 5°.

An embodiment of the invention applied to a vertical enlarger in which the length of the optical part is regulated by a pair of moving reflectors is illustrated by way of example in the accompanying drawings.

Figure 2:
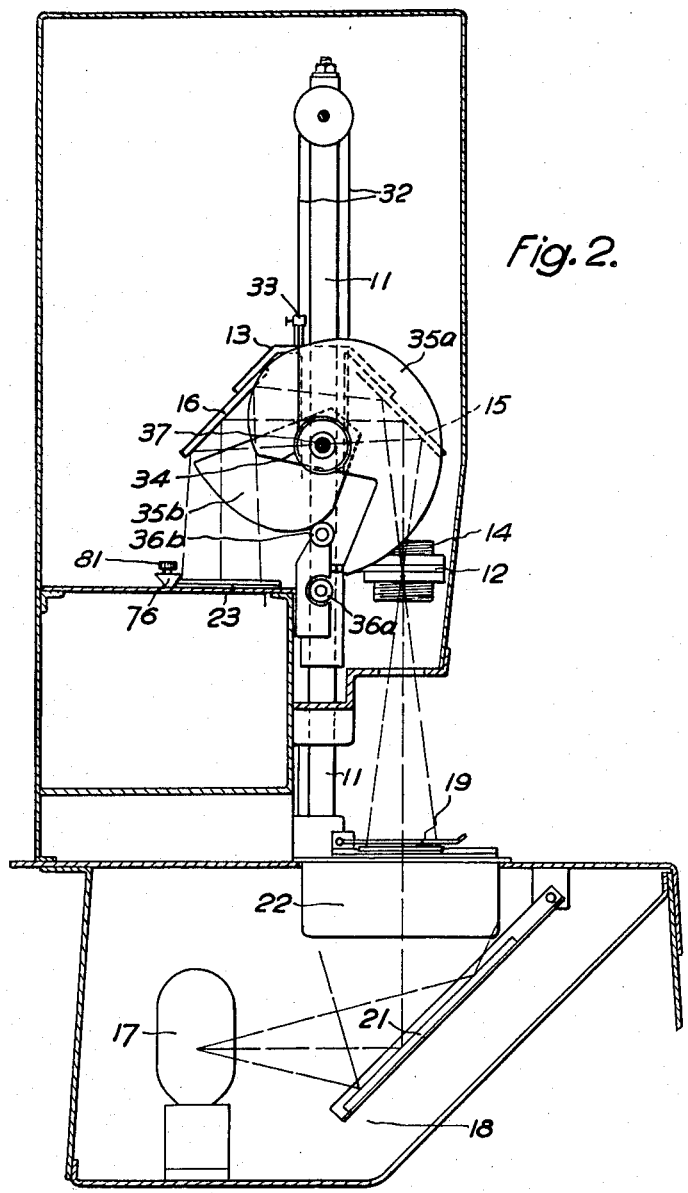

FIG. 1 is a front view partly in section of part of the enlarger and FIG. 2 is a side view partly in section of FIG. 1.

The apparatus shown in the drawings incorporates a pair of vertical guide rods 11 on which slide carriages 12, 13 respectively carrying the objective 14 and mirror system comprising two mirrors 15, 16. The light source in the form of a lamp 17 is mounted in a lamp housing 18 which from the operator's point of view is behind and below the location 19 of the negative carrier and the light is redirected on to the negative carrier by a reflector 21 conveniently at 45° to the optical axis. The light reaches the negative carrier through a condenser 22 and thence reaches the objective 14 above which is disposed the mirror 15 set at 45° to the optical axis. The light thereby reflected is received by the mirror 16 again at 45° which redirects the beam downwardly. It is brought to a focus at the plane of a paper guide 23. The whole apparatus may be mounted on a desk-like support (not shown) to bring it to a convenient height.

To provide for change in the scale of enlargement while keeping the image in focus at the paper plane the carriage 13 supporting the mirrors 15, 16 and the carriage 12 supporting the objective 14 are controlled by an automatic focusing adjustment. This requires a simultaneous change in the position of the two carriages but since only a range of enlargements and no reduction has to be covered every specific distance between the negative and paper requires only one position of the objective. In this example the carriage 13 is attached to a flexible wire cable 32 by a clamp 33, the cable being endless and its lower loop end being looped one or more times round a drum 34 so that a drive can be imparted to the cable to raise and lower the carriage 13. To the drum 34 is secured a cam against which bears a follower carried by the carriage 12. A spring 31 serves to keep the follower riding against the cam. The drum 34 is fast on a shaft 37 provided with a hand knob 38. Thus by rotating the knob 38 the two carriages are moved simultaneously and the cam is shaped so that the image remains in focus at the paper plane at any adjustment within the total range.

With this lay-out of the focusing mechanism the steepest part of the cam covering the range of lower magnification is at the portion of smallest radius. If the cam were in one piece the radius which this part would need to have to avoid strain and binding would result in the portion which covers the range of higher magnification having an inconveniently large radius. To avoid this the cam is divided into two portions, a portion 35a covering the range of lower magnification and a portion 35b covering the range of higher magnification while the carriage 12 is correspondingly provided with two rollers 36a, 36b; the two cam portions slightly overlap so that the carriage 12 is at all times fully controlled.

An alternative mechanism comprises a rack and pinion to replace the cable 32 and drum 34, the rack being attached to the carriage 13 and the pinion replacing the drum 34 but the cable arrangement is preferred because it is freer from backlash.

Instead of rotating the shaft 37 by hand, motor operation can be used, for example an electric motor driving through worm gearing, in which case a friction clutch with an adjustable spring is desirably interposed between the worm-wheel and shaft to limit the torque which can be applied to the shaft.

It will be understood that the invention is not limited to the use of the reflectors 15, 16 to control the optical distance between the negative location 19 and paper guide 23. Thus the carriage 13 can itself carry the paper guide 23. The invention is also applicable to the case in which the paper guide remains fixed and the negative carrier is moved by a carriage similarly operated to the carriage 13. Similarly the invention is not limited to a vertically arranged enlarger. Further the two cam portions could be on separate spindles suitably geared together, and the control of the optical distance between the negative and paper need not be directly coupled to the cam spindle or one of the cam spindles.

What I claim is:

1. Photographic apparatus having a range of magnification ratios with a single objective with automatic focusing, comprising an objective mounted in a carriage, magnification adjusting means having means to slidably adjust the carriage relative to the distance of the objective from a sensitized paper, a pair of cams having curved surfaces to control the position of the carriage, a pair of rollers mounted on the carriage one for each cam, a shaft on which the cams are mounted, means actuated by said magnification adjusting means to rotate the shaft to adjust the cams relative to the rollers, one of the cams having a portion to cover the range of lower magnification and the other cam having a portion to cover the range of higher magnification, and a spring connected to the carriage to force at least one of the rollers against a portion of one of the cams at all times.

2. Photographic apparatus according to claim 1, in which one cam has a larger minimum radius than the other cam.

3. Photographic apparatus having a range of magnification ratios with a single objective with automatic focusing, comprising an objective mounted in a carriage, magnification adjusting means having means to slidably adjust the carriage relative to the distance of the objective from a sensitized paper, a pair of cams rotated by said magnification adjusting means having curved surfaces to control the position of the carriage, a pair of rollers mounted on the carriage one for each cam, one of the cams having a portion to cover the range of lower magnification and the other cam having a portion to cover the range of higher magnification, and a spring connected to the carriage to force at least one of the rollers against a portion of one of the cams at all times.

4. Apparatus according to claim 1, in which the two portions of the cams slightly overlap.

5. Apparatus according to claim 1, in which reflectors and a carriage are provided with the reflectors mounted on the carriage and located intermediate the objective and sensitized paper so that the optical distance between the negative and paper is determined by the reflectors operable by the shaft.

6. Apparatus according to claim 1, in which the movement of the objective is vertical.

References Cited by the Examiner

UNITED STATES PATENTS

| 1,543,015 | 6/25 | Lare | 88—24 |
| 2,256,397 | 9/41 | Luboshez | 88—24 |
| 2,431,612 | 11/47 | Furnas. | |
| 2,889,741 | 6/59 | Luz | 88—24 |
| 3,007,369 | 11/61 | Squassoni et al. | 88—24 |

FOREIGN PATENTS

| 805,590 | 5/51 | Germany. |

EVON C. BLUNK, *Primary Examiner.*

NORTON ANSHER, *Examiner.*